Patented Nov. 27, 1934

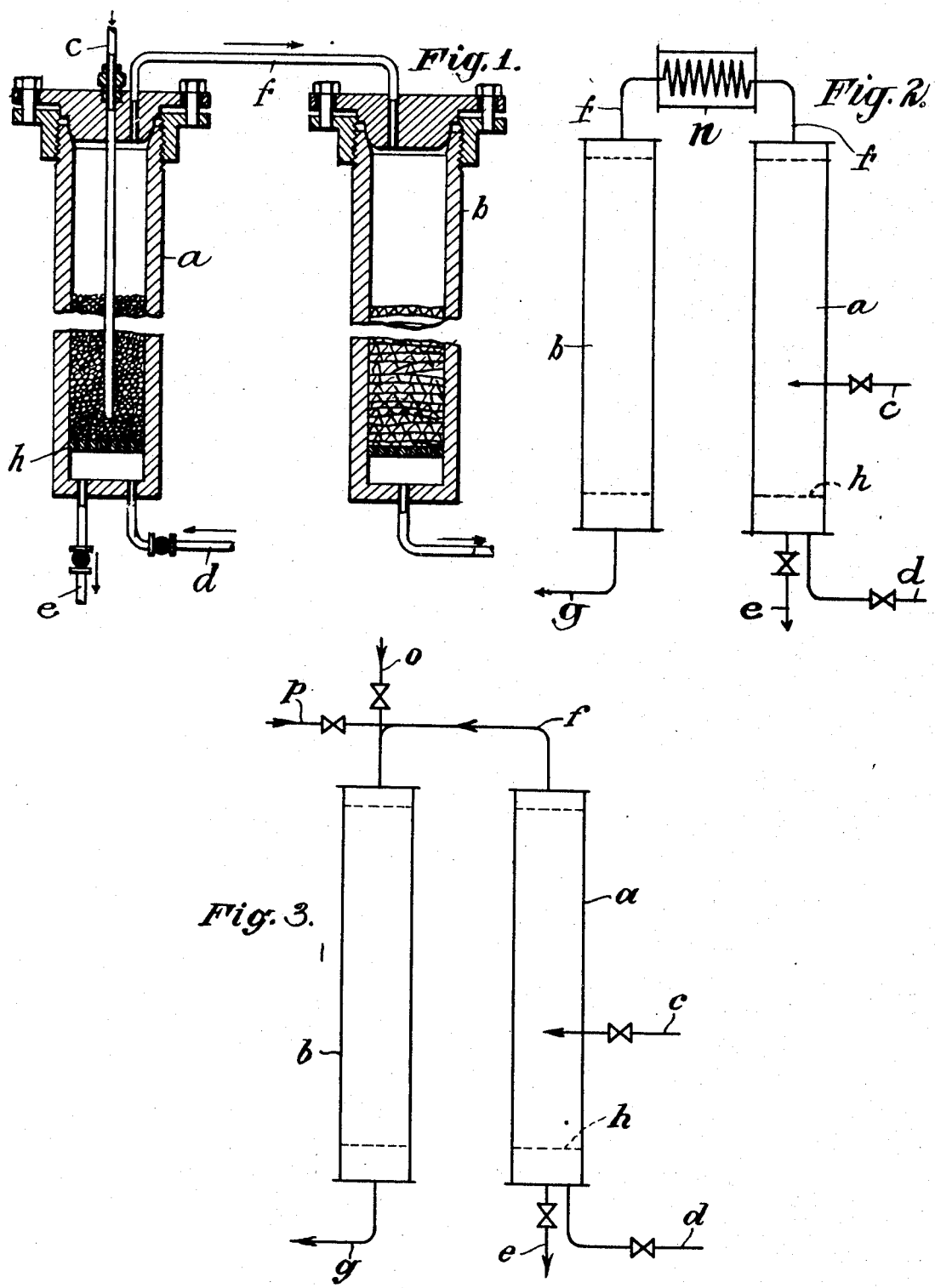

1,982,556

UNITED STATES PATENT OFFICE 1,982,556

PROCESS OF CATALYTIC TREATMENT OF CARBONACEOUS BODIES

Ludwig von Szeszich, Constance, Germany, assignor to Deutsche Gold- und Silber-Scheideanstalt vormals Roessler, Frankfort-on-the-Main, Germany, a corporation of Germany Application October 15, 1930, Serial No. 488,982
In Germany October 22, 1929

9 Claims. (Cl. 196—53)

This invention relates to the catalytic treatment of carbonaceous bodies, and particularly tars, tar oils, mineral oils, and so forth, and is especially concerned with a preliminary treatment the object of which is to remove ash and other more or less insoluble bodies which are found to have an injurious effect upon the catalyst subsequently used in the hydrogenation of the body. It has, in fact, been found that even when such constituents are only present in quite small quantities in the carbonaceous bodies forming the starting material, they are liable to separate out during the hydrogenation process on to the surface of the catalyst so that the activity of the latter is rapidly reduced, or even lost entirely. It has also been found that such catalyst when it has been thus covered in practice cannot economically be regenerated. This fact is particularly a nuisance in a plant which ought to be worked continuously, since such a process would have to be interrupted and a good deal of time wasted in removing the catalyst which has thus become inactive and in replacing it by fresh material.

According to the present invention, the injurious constituents in the starting material are removed in a separate vessel before the starting material passes into the hydrogenation vessel proper. For this purpose the raw material introduced into the preliminary vessel may be in the presence of hydrogen and preferably under pressure, and is conducted at a high temperature over an inert filling material, on to which the injurious constituents are precipitated. Raschig rings, filling bodies of glazed earthen ware or porcelain or the like, which themselves are incapable of exerting catalytic action in the presence of hydrogen, are suitable for employment as filtering filling material.

The hydrogen may be introduced in admixture with the gases necessary for the subsequent hydrogenation. Thus any mixture of gases which may be used in accordance with U. S. A. patent application Serial No. 314,849, filed 24th October 1928, now Patent No. 1,852,988 and No. 414,568, filed 16th December 1929 may be led directly into the preliminary vessel or ash separator, together with the other starting materials. The ash is precipitated on the inert filling material, which is removed from the separating or purifying vessel with the filling material in any well known manner continuously or discontinuously. If bodies are employed as starting materials which contain asphaltic substances, the latter for the most part separate out with the ash if the temperature is suitably regulated. These materials generally precipitated in such amounts that the ash constituents flow away from the filling bodies in suspension or in solution in the asphalt, and they can be drawn off from the bottom of the vessel either continuously or discontinuously. Thus the process has the advantage that the separation of ash is not interrupted and the filling material does not need to be renewed so that the working of the process is not interrupted. In treating raw materials in which the asphaltic content is very small or not sufficient when separated to flow and to take off the ash constituents, bodies containing more asphaltic constituents may be added in the separating vessel in order to provide sufficient asphaltic material to cause the ash to flow off. In fact, in this event any suitable materials may be added to the separating vessel in order to cause the ash constituents to pass into suspension or solution.

Such materials to be added are for instance tars rich in asphaltic substances, tar oils, mineral oils and the like. Furthermore organic liquids which are vaporized with difficulty such as for instance liquids of high boiling point derived from hydrogenation, or similar reactions come in consideration as additional substances. Such liquids may be introduced in quantities of for instance one to five percent (calculated on the starting material). Their introduction may be effected for instance by admixing them to the starting materials right at the beginning.

The fact that the asphaltic bodies are also separated presents the advantage that they do not come in contact with the catalyst in the second vessel and cannot contaminate the catalyst, so that it has a much longer working life.

Some apparatus suitable for carrying out the novel process according to the invention are shown in the accompanying drawing, in which:—

Figure 1 is a diagrammatic sectional elevation of one form of apparatus;

Figures 2 and 3 are purely diagrams showing slight modifications of the apparatus.

In all of these figures the ash separator is shown at $a$, while the reaction vessel proper is shown at $b$. The oil forming the starting material is fed in at $c$ and the hydrogen at $d$. Asphalt and ash may be drawn off at $e$, while the oil vapours and hydrogen pass from the ash separator $a$ into the reaction vessel $b$ through the pipe $f$. The finished product in each case is led away at $g$.

The filling material in the ash separator rests upon a perforated plate $h$.

The temperature which is necessary for the preliminary treatment for the separation of ash in the vessel *a* depends chiefly upon the nature of the starting material admitted at *c*.

In general the temperatures in the vessel, where the preliminary treatment is carried out should be over 350° centigrade for instance between 350 and 500° C., preferably between 425 and 475° C.

No general rules can be given, but tests must be made in each case to determine the temperature to which the heating must be carried in order that the injurious ash constituents may be separated. When practical conditions permit, it is desirable to carry the temperature so high that the materials to be treated pass into the reaction vessel *b* at the most favourable temperature for the hydrogenation reaction, in which event the separator *a* also serves as a preheater. If the temperature in the ash separator *a* is above that required for the hydrogenation process, a cooler, such as shown at *n* in Figure 2 may be introduced in the pipe *f* between the ash separator *a* and the reaction vessel proper to lower the temperature of the materials after the starting material has had its preliminary treatment. On the other hand, if the temperature in the separator is too low, then preferably separate heating is arranged for the materials after leaving the separator *a* and before passing into the reaction vessel *b*. For example, a heater may be arranged at the point *n* instead of a cooler.

A reduction in temperature may also be produced by introducing cooler hydrogen, for example, through the additional inlet pipe *o* shown in Figure 3, in which event the whole of the hydrogen will not, of course, be introduced into the ash separator *a* through the pipe *d*, but only a portion of it, the other part being supplied through the inlet pipe *o*. Instead of cooling in this way, or in addition to it, purified oil which has been cooled may be introduced between the separator *a* and the hydrogenation vessel *b*, for example, through the inlet pipe *p*. Again, if the temperature in the separator *a* is too low, separate heating may be introduced by arranging that the hydrogen entering at *o* or the purified oil entering at *p*, or both, may be at a raised temperature so as to increase the temperature of the mixture passing through the pipe *f* from the separator *a* into the reaction vessel *b*.

It may be briefly stated that in carrying out the invention, the aim is, wherever possible, to reproduce in the separating vessel the conditions as regards temperature, pressure and the treatment gases present which exist subsequently in the reaction vessel, with the exception, of course, that there is no catalyst in the separating vessel. The result is that under these conditions, any injurious bodies which would otherwise become insoluble and separate off in the reaction vessel are actually made insoluble and separated off in the separating vessel. In some cases, if desired, the filling material in the separating vessel may be kept in motion while the separating process is going on.

*Example 1.*—Brown coal tar oil with an ash content of 0.15 per cent is led with the hydrogen into the separator, which is a vessel capable of withstanding pressure and filled with glazed earthenware rings. The oil is raised to a temperature of 450° C. under a pressure of 200 atmospheres in that vessel, in which 1 to 2 per cent of asphalt and the whole of the ash are separated and drawn off at the bottom as already described. It has been found that the catalyst during the destructive hydrogenation process is not affected after working for several days. On the other hand, without the preliminary treatment of the tar oil, the activity of the catalyst in the reaction vessel falls off quickly, so that in some cases it is practically wholly inactive after 24 hours.

*Example 2.*—A crude Pennsylvanian mineral oil containing 0,05% ash is introduced with hydrogen into the ash separator *a* (see Fig. 1). The separator is filled with porcelain rings. The temperature is maintained at 435° C., the pressure at 200 atmospheres. Before the mineral oil is charged into the vessel about 1% of a residue is added which has been derived from a previous destructive catalytic hydrogenation under pressure and which containing paraffin substances vaporizers at a high temperature. 1.5% of an asphalt like liquid is drawn off from the preliminary treatment vessel. This liquid contains the total ash.

The purified oil is then charged together with hydrogen into the hydrogenation vessel *b* where it is hydrogenated in the presence of suitable hydrogenating catalyzers at 435° C. and at a pressure of about 200 atmospheres. An oily hydrogenized product is obtained with a yield of 90% which contains 70% of benzin. The efficacy of the catalyst is not impaired by deposit of ash to any extent worth mentioning even after it has been working for several weeks.

What I claim is:

1. In a process for improving liquid carbonaceous substances by destructive catalytic hydrogenation, the step which consists in subjecting said starting materials to a preliminary treatment under such conditions and for such a time that hydrogenation does not occur, said treatment being effected at a pressure of 100 to 250 atmospheres by passing said carbonaceous substances in the presence of hydrogen through separation zones charged with inert non-catalytic filling bodies having smooth surfaces at temperatures between 375° C. and 475° C. during which separation of the ash and asphalt content of the carbonaceous materials occurs, and subsequently subjecting the purified materials to catalytic hydrogenation.

2. In a process for improving liquid carbonaceous materials by destructive catalytic hydrogenation, the step which consists in subjecting said starting materials, before they are introduced into the reaction vessel in which they are hydrogenated, to a preliminary treatment under such conditions and for such a time that hydrogenation does not occur by passing said carbonaceous substances in admixture with hydrogen through zones charged with smooth inert non-catalytic filling bodies at temperatures between 375° C. and 475° C. and at pressures between 100 and 250 atmospheres, during which separation of the ash content of the carbonaceous starting materials occurs.

3. In a process as claimed in claim 1, the step of continuously removing from said separation zones the ash and asphalt which are separated from the carbonaceous substances.

4. A process according to claim 1 in which the preliminary treatment is carried out in the presence of substances which have the property of causing the separated ash to enter a phase of suspension.

5. A process according to claim 1 in which the hydrogenation is carried out at the same temperature to which the carbonaceous substances are subjected during the preliminary treatment.

6. A process according to claim 1 in which the hydrogenation is carried out at the same pressure to which the carbonaceous substances are subjected during the preliminary treatment.

7. A process according to claim 1 in which the hydrogenation is carried out at the same temperature and pressure to which the carbonaceous substances are subjected during the preliminary treatment.

8. In a process according to claim 1, the step of maintaining the purified materials after the preliminary treatment and through the catalytic hydrogenation at a temperature between the limits of 375° C. and 475° C. which is most favorable for the hydrogenation process by the addition of hydrogen gas to the purified material at a suitable temperature and in sufficient quantity until the desired temperature is attained.

9. In a process according to claim 1, the step of maintaining the purified materials after the preliminary treatment and through the catalytic hydrogenation at a temperature between the limits of 375° C. and 475° C. which is most favorable for the hydrogenation process by the addition of purified oils to the purified material at a suitable temperature and in sufficient quantity until the desired temperature is attained.

LUDWIG von SZESZICH.